(12) United States Patent
Jonsson et al.

(10) Patent No.: US 7,212,511 B2
(45) Date of Patent: May 1, 2007

(54) SYSTEMS AND METHODS FOR VOIP WIRELESS TERMINALS

(75) Inventors: Lars-Erik Jonsson, Luleå (SE); Ghyslain Pelletier, Luleå (SE); Krister Svanbro, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1124 days.

(21) Appl. No.: 10/103,016

(22) Filed: Mar. 22, 2002

(65) Prior Publication Data

US 2002/0146000 A1 Oct. 10, 2002

Related U.S. Application Data

(60) Provisional application No. 60/281,802, filed on Apr. 6, 2001.

(51) Int. Cl.
*H04Q 7/24* (2006.01)
(52) U.S. Cl. ...................... 370/338; 370/474
(58) Field of Classification Search .............. None
See application file for complete search history.

(56) References Cited

U.S. PATENT DOCUMENTS

| | | | |
|---|---|---|---|
| 6,625,671 B1 * | 9/2003 | Collette et al. .............. 710/52 |
| 6,711,140 B1 * | 3/2004 | Agarwal et al. ............ 370/324 |
| 6,845,105 B1 * | 1/2005 | Olsson et al. .............. 370/469 |
| 6,882,637 B1 * | 4/2005 | Le et al. ..................... 370/349 |
| 6,967,964 B1 * | 11/2005 | Svanbro et al. ............. 370/437 |

FOREIGN PATENT DOCUMENTS

| EP | 0 835 037 | 4/1998 |
|---|---|---|
| EP | 0 835 037 A2 | 4/1998 |
| EP | 1 056 259 | 11/2000 |
| WO | WO 00/38391 | 6/2000 |
| WO | WO 00 38391 | 6/2000 |

OTHER PUBLICATIONS

"ITU-T, H. 323, Packet-Based Multimedia Communications Systems,"Sep. 1999, pp. 1-129, XP002166480.
Casner, S. et al., "Compressing IP/UDP/RTP Headers for Low-Speed Serial Links," Network Working Group, Feb. 1999, XP002121319.
"ITU-T, H.323, Packet Based Multimedia Communications System" ITU-T H.323, XX, XX, Sep. 1999, pp. 1-129, XP002166480 paragraph '6.2.5! paragraph '09.7!
Casner S et al: "Compressing IP/UDP/RTP Headers for Low-Speed Serial Links" Network Working Group, Feb. 1999, XP002121319 paragraph '01.0! paragraph '0002!

* cited by examiner

*Primary Examiner*—Phirin Sam (57) ABSTRACT

Systems and methods are provided for Internet Protocol (IP) based communication systems without using a complete Internet Protocol stack on both sides of a communication link. Various exemplary embodiments include communication of audio information over a wireless transmission channel to a wireless terminal from a network that includes transmission of audio information using voice over Internet Protocol (VoIP). A first communication system and method may include a wireless terminal having a dedicated audio application that includes processing for header compression and decompression. A second communication system and method may include a wireless terminal and a network device (e.g., a network transmitter/receiver terminal), each containing at least a portion of an Internet Protocol stack, and the network device may include a header modification means that may reduce or eliminate the header from VoIP packets it will send to the wireless terminal.

19 Claims, 8 Drawing Sheets

SYSTEMS AND METHODS FOR VOIP WIRELESS TERMINALS

CROSS-REFERENCE TO RELATED APPLICATIONS

The present application claims priority to provisional patent application Ser. No. 60/281,802 filed on Apr. 6, 2001, the complete disclosure which is incorporated herein by reference for all purposes.

FIELD OF THE INVENTION

The present invention pertains to systems and methods for implementing Internet Protocol (IP) based communications. In particular, the invention involves systems and methods for implementing, for example, voice over Internet Protocol (VoIP) without utilizing a full Internet Protocol stack on both sides of a communication link, for example a wireless link.

BACKGROUND OF THE INVENTION

Due to the tremendous success of the Internet, it has become a challenging objective and task to make use of the Internet Protocol (IP) over all kinds of communication links, including wireless links. One particular challenge is using Internet Protocol for wireless communications. Wireless communication is typically performed by employing devices which are variously known as mobile stations, mobile telephones, and wireless mobile telephones (which are herein referred to by the more generic term wireless terminals), and which typically communicate using a relatively narrow bandwidth. On the other hand, Internet Protocol is somewhat bandwidth inefficient because a typical information transmission may have a significant portion of the transmitted information related to administrative overhead rather than substantive data.

Internet Protocol enables transfers of information in packets from one point (or electronic device) to another point (or electronic device) through a web of networks without using a predetermined or dedicated path. Internet Protocol packets include a header containing administrative information such as routing information (e.g., destination address), and a payload containing the substantive information (e.g., digital data from an application software or digital audio data from a conversation). When ordinary audio data, such as speech or voice information, is transported by the ordinary protocols such as Internet Protocol (IP), user datagram protocol (UDP), and realtime transport protocol (RTP), the header may represent about 70% of the packet. Having such a large portion of the packet taken up by header information will result in a very inefficient usage of the link. In this example, only approximately 30% of the used bandwidth is allocated to substantive information. Therefore, it is a particularly difficult task with many wireless links that have narrow bandwidth, e.g., wireless terminals with cellular links, to achieve efficient transmission because that large headers are employed by Internet Protocol.

Transporting audio data using Internet Protocol is particularly challenging because audio information, e.g., speech or voice information, compared to many other types of data, is particularly sensitive to delays. Accordingly, the quality of words being transmitted using Internet Protocol (i.e., voice over IP (VoIP)) may be reduced by the amount of space in a packet taken up by the header since the header reduces the amount of audio information per packet. One way developed to address the large header sizes employed in Internet Protocol is known as header compression.

Header compression (HC) minimizes the necessary bandwidth for information carried in headers on a per-hop basis (i.e., from one device to another in a chain of devices making up a network) over point-to-point links. The header compression techniques for reducing the header size, in general, have a long history of use within the Internet community. Several commonly used header compression protocols include Internet Engineering Task Force (IETF) request for comment (RFC) 1144 (Van Jacobson (VJ)), RFC 2507 (Internet Protocol Header Compression (IPHC)) and RFC 2508 (compressing realtime transport protocol (CRTP)). Header compression takes advantage of the fact that some fields in the headers are not changing from packet to packet within a particular flow of transmitted information, or change with small and/or predictable values. Header compression schemes make use of these characteristics and send static information only initially, while changing fields are sent with their absolute values or as differences from packet to packet. Completely random information has to be sent without any compression at all. One can usually consider a header compression scheme as some type of a state machine and the challenging task is to keep the compressor and decompressor states, called contexts, consistent with each other, while keeping the header overhead as low as possible.

Header compression is thus an important component to make Voice over IP (VoIP) over Wireless (VoIPoW) an economically feasible alternative to circuit switched voice. Header compression solutions for this purpose have been developed by the Robust Header Compression (ROHC) Working Group of the IETF. Given today's communication and electronics technology, using VoIPoW without header compression is unlikely to provide a reasonable audio quality for most VoIP uses. However, header compression processing takes processing time and power which is usually a concern in wireless terminals, for example mobile telephones, that are often small hand-held devices that operate on battery power. Therefore, although header compression is likely to be used for VoIP communications for the foreseeable future it does have some drawbacks for VoIPoW.

In existing second generation wireless radio telephony, most of the wireless network's equipment, particularly the wireless terminals and base stations, do not have VoIP capability. Rather, they operate using other protocols prevalent with present generation wireless telephones, for example, Global System for Mobile communications (GSM), Personal Digital Communications (PDC), Code Division Multiple Access (CDMA), or Wideband CDMA (WCDMA). However, due to the popularity of Internet Protocol in fixed networks, it is desirable to implement VoIP in wireless networks. The focus for the future is to implement end-to-end VoIP communication as part of an all Internet Protocol network. However, to implement VoIP will require changes and migration to both network hardware and software in such areas as base stations, and changes to wireless terminals to support VoIP. These changes will be difficult to coordinate, time consuming, and expensive. Therefore, a more timely, cost effective, and easy to implement interim standard to make interim implementations interoperable with other implementations at least in part compliant to existing Internet Protocol standards would be useful.

SUMMARY OF THE INVENTION

It should be emphasized that the term "comprises/comprising" when used in this specification is taken to specify the presence of stated features, integers, steps or components but does not preclude the presence of addition of one or more other features, integers, steps, components or groups thereof.

The present invention is directed to providing systems and methods for Internet Protocol based communication systems without using a complete Internet Protocol stack on both sides of a communication link. For example, various embodiments are provided introducing interim systems and methods using existing standards for transmission of information to wireless terminals which originate from networks operating at least in part with an Internet Protocol suite using, for example, a combination of RTP/UDP/IP protocols so as to communicate using an Internet Protocol signal format. Various approaches are described for providing speech or voice information (which are herein referred by the more generic term audio information), and data information, over a wireless transmission channel to a wireless terminal from a network that includes transmission of audio information using Internet Protocol, e.g., voice over Internet Protocol (VoIP). In preferred embodiments, the invention includes end-to-end VoIP solutions for wireless terminal communications, particularly for audio information (e.g., digitized speech information from a telephone conversation). Other Internet Protocol applications may also be supported by the systems and methods. As such, various protocol stacks and audio flows are provided for supporting VoIP that are particularly well suited for wireless communication applications.

The invention provides simplified network implementations without dual protocol stacks while supporting both generic Internet Protocol terminals and dedicated audio terminals. This simplifies and improves flexibility in deployment, avoids unnecessary complexity and reduces hardware and software needs. As such, deployment costs may be reduced.

Further, the present invention may provide improved quality of service and efficiency benefits by eliminating all or a portion of the typical header processing in the wireless terminal. As such, the processing time and device energy of wireless terminal when sending and/or receiving audio information of, for example, a typical telephone conversation, may be reduced. Note that although the invention is explained in terms of a telephone conversation as an example, the present invention may be applicable to other types of applications such as streaming video and multimedia information that may be sensitive to the header compression processing time and power requirements.

BRIEF DESCRIPTION OF THE DRAWINGS

The objects, features and advantages of the present invention will become more readily apparent to those skilled in the art upon reading the following detailed description, in conjunction with the appended drawings, in which.

DETAILED DESCRIPTION OF THE INVENTION

In general, the present invention is directed to providing various systems and methods for supporting Internet Protocol communications from a network to a remote, wireless terminal. As such, various protocol stacks and information flows are provided herein for achieving an interim solution for end-to-end Internet Protocol based communications. However, one skilled in the art will recognize that the present invention may be useful for various wireline and fiber optic communication systems, e.g., wireline VoIP telephones and systems using header compression.

End-to-end Internet Protocol (IP) for all applications is an objective for upcoming generations of computer and communications systems as the Internet and various telecommunication systems continue to become integrated. However, the cost and time it will take to convert present circuit switched networks is considerable, particularly for telecommunication systems and for using Internet Protocol for transporting audio information. Various quality of service issues occur when sending audio information using Internet Protocol. The quality of service issues are taking some time to resolve. Therefore, it seems prudent from a deployment perspective to create an interim solution that will be more timely to implement and provide an incremental step in system costs.

The present invention provides various terminal-based and network-based solutions to be implemented during a transition period before achieving complete end-to-end Internet Protocol communications. These terminals may be built using conventional hardware and software and provide limited access to Internet connectivity for certain applications, especially applications including audio information. The design of wireless terminals is particularly challenging and it is important to provide support for these kinds of terminals by network entities, e.g., a base station and associated processing means, that are in general designed with the future all-Internet Protocol vision in mind. As such, the network entities should include typical Internet Protocol connectivity configurations without any significant effect on the ability for these interim network entities to be used in the next generation end-to-end Internet Protocol communication system.

Figure 1:
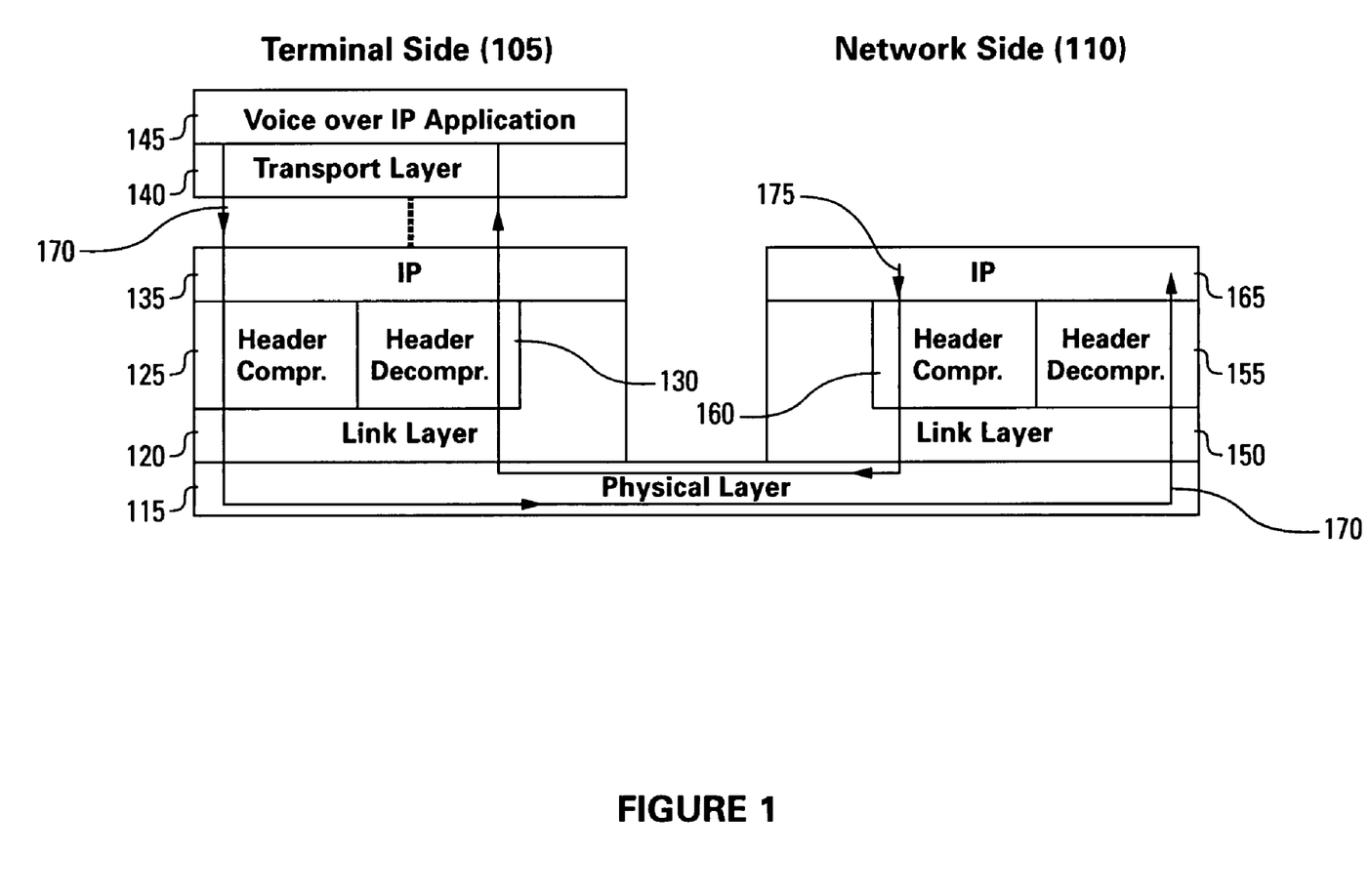
FIG. 1 illustrates an exemplary protocol stack and audio flow for a VoIP setup using distinct header compression and decompression modules on the network side and the terminal side of a communication system.

As the communication systems move closer to end-to-end Internet Protocol compatible, wireless terminals will become Internet Protocol-based and all services will be provided according to the Internet Protocol model, including the transmission of audio information and services (i.e., voice over Internet Protocol (VoIP)). In one exemplary end-to-end Internet Protocol communication system audio traffic may be handled as shown in FIG. 1, having a terminal side 105 and a network side 110, both including a full Internet Protocol stack for audio information process. The full Internet Protocol stack may include an Internet Protocol layer 135, and a header compression module 125 and a header decompression module 130 included in a link layer 120. The Internet Protocol layer 135 may be, for example, IPv4 or IPv6 (Internet Protocol version 4 or 6). A link layer 120 may be, in the case of wireless mobile telephony, a set of protocols meant to address the connection over the wireless medium, and may include mechanisms such as error protection, error detection, retransmission, etc. The terminal side 105 may also include a VoIP application layer 145, a transport layer 140, and a physical layer 115. For example, the VoIP application layer 145, may be comprised of any realtime transport protocol (RTP) application and may use an audio coder/decoder (codec). The transport layer 140 may include, for example, user datagram protocol (UDP) or transmission control protocol (TCP) for VoIP. The physical layer 115 may be the wireless medium. The normal Internet Protocol stack for the network side 110 may include an Internet Protocol layer 165, and a link layer 150 which includes a header compression module 160 and header decompression module 155. The network side 110 may also include a physical layer 115.

The protocol configuration in FIG. 1 may be used for any Internet Protocol based application, including VoIP applications. As illustrated, audio information 170 (e.g., a digitized voice or speech) originating from the terminal side 105 (e.g., a wireless terminal) is sent from the VoIP Application 145 through the transport layer 140 to the Internet Protocol layer 135 where the digitized audio information is placed in Internet Protocol packets having header information (e.g., origination information routing information, sequence information, etc.). Next the Internet Protocol packets are sent to the header compression module 125 and the header size is reduced. Then the audio information 170 is sent from the link layer 120 to the physical layer 115 to be transported, using for example radio wave communications, to the physical layer 115 of the network side 110. One example of the physical layer 115 is the transceiver and antenna in a wireless terminal on the terminal side 105, and a transceiver and antenna in a base station on the network side 110. At the network side 110 the audio information 170 is sent to the link layer 150 for processing by the header decompression module 155 where the Internet Protocol packet headers are decompressed. The Internet Protocol packets are then sent to the network side Internet Protocol layer 165 with decompressed Internet Protocol headers. The network then forwards the Internet Protocol packets to the intended destination. Note that the terminal side 105 may be any one of a number of wireless terminals including a mobile telephone, a personal digital assistant (PDA), a laptop or portable personal computer (PC), a desktop computer with wireless connection, a tablet PC, etc., without limitation. Further, the network side may include a base station, a base station controller, a router, a server, etc., without limitation.

Audio information 175 originating on the network side 110 to be sent to the terminal side 105 is similarly routed and processed as illustrated in FIG. 1. The audio information 175 is in Internet Protocol packet format and has its header compressed by header compression module 160 on the network side 110 and decompressed by the header decompression module 130 on the terminal side 105.

Note that the particular protocol configuration shown in FIG. 1 will support any Internet Protocol based application for data transmission of digital information including, audio information, streaming video information, multi-media information, etc., and is the preferred protocol configuration for all Internet Protocol applications, even those including wireless links. However, supporting Voice over IP over Wireless links (VoIPoW) in the near term is more likely to require an interim approach that solves the quality of service problems for audio information without supporting all applications with end-to-end Internet Protocol. Further, the very general solution provided in FIG. 1 may be more complicated then need be, particularly the terminal side 105 may have more functionality than needed to support audio communications.

Figure 2:
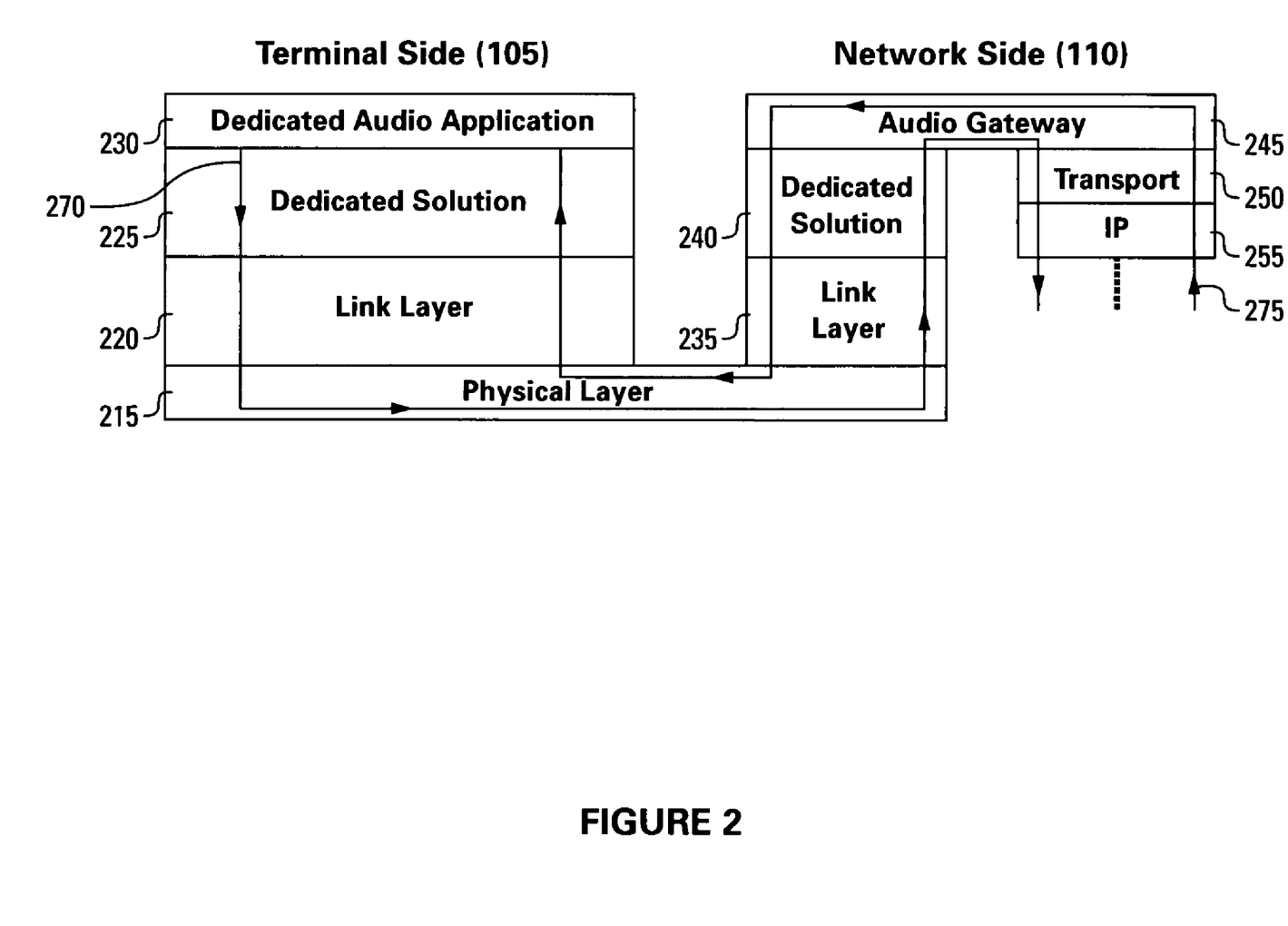
FIG. 2 illustrates an exemplary protocol stack and audio flow for a VoIP setup using a network side audio gateway and a dedicated audio application on the terminal side of a communication system.

One simplified terminal approach for providing audio communication between a wireless terminal and an Internet Protocol based network is provided in FIG. 2. Although it may be preferable in some respects, the VoIP application (e.g., an entity that may implement an application protocol such as RTP in combination with an audio encoder/decoder that may take an audio signal, convert it to a digital format, encode it into a compressed digital format, packetize it into application packets and pass it over to a transport layer) does not necessarily have to reside within the terminal side 105 equipment. For example, there might also be several Internet Protocol hops between the wireless terminal and the end VoIP host where the transport layer and VoIP application reside. As illustrated in FIG. 2, terminal side 105 may be interconnected to other audio peers within the Internet Protocol domain through gateways, such as audio gateway 245. According to this approach, no Internet Protocol components reside in the terminal side 105 because the Internet Protocol formatted packets are terminated on the network side 110 and dedicated transport solutions (e.g., GSM, CDMA, etc.) are used from the audio gateway 245 to a wireless terminal on the terminal side 105.

The terminal side 105 may include a wireless terminal that has, for example, conventional equipment and a conventional protocol stack. The terminal side 105 protocol stack may include a physical layer 215 that may be, for example, a radio wave transceiver and antenna. The physical layer 215 may be coupled to a link layer 220. The link layer 220 may include, for example, ARQ mechanisms (Automatic Repeat reQuests) for retransmission of erroneous data over the link, radio resources management functionality, radio measurements, handover functionality, e.g., anything related to the maintenance of the wireless channel over the physical medium. The link layer 220 may be coupled to a dedicated solution 225. For example, the dedicated solution 225 may include a wired connection to the transceiver. The dedicated solution 225 may be coupled to a dedicated audio application module 230. The dedicated audio application 230 may include, for example, a codec for GSM, PDC, CDMA and/or WCDMA.

On the network side 110, the protocol stack may include a physical layer 215, such as a transceiver and antenna, coupled to a link layer 235. The link layer 235 may be coupled to the dedicated solution 240 that may include, among other things, an audio codec (e.g., GSM, EVRC (enhanced variable rate codec), SMV (selectable multi-rate vo-coder), AMR (adaptive multi-rate) and possibly some in-band application signaling as well. The dedicated solution 240 may be coupled to an audio gateway 245 that converts VoIP packets from VoIP format to audio information in any number of signal formats as required by the dedicated solution 240. The network side 110 may also include a transport layer 250 coupled to the audio gateway 245 and an Internet Protocol layer 255 coupled to the transport layer 250.

Even though the gateway-based model is clean and simple and may provide support for simplified or specialized terminals to be interconnected to VoIP peers, it may have some deployment drawbacks. For example, one deployment drawback may be the significant additions that are needed on the network side to support the dedicated terminals with dedicated audio applications 230. When there is an audio gateway 245 on the network side 110, there are two protocol stacks, one including the Internet Protocol layer 255 and the transport layer 250 and one including the dedicated solution 240 and the link layer 235.

Since the true audio over Internet Protocol support to the system is provided in this implementation anyway (i.e., Internet Protocol layer 255 and transport layer 250), it may be advantageous to reuse as much of the functionality in the entities on the network side as possible when providing support for the dedicated terminals. However, this is not easily achieved with the gateway solution because this solution requires the network side to work as an endpoint for the Internet Protocol based traffic. This means that both an Internet Protocol transport layer protocol stack (e.g., Internet Protocol layer 255 and transport layer 250) and an audio gateway application layer 245 must be implemented on the network side along with the dedicated networking functionality needed for communication with the dedicated terminal side 105 to support non-Internet Protocol terminals (e.g., circuit switched type of service) on the terminal side 105. Further, the separate Internet Protocol stack would need to be coupled to the physical layer 215 on the network side 110 to support strictly Internet Protocol terminals (e.g., packet switched service) on the terminal side 105. Thus, using the gateway approach, support for various types of non-Internet Protocol terminals and Internet Protocol terminals would require dual protocol stacks on the network side. Further, the gateway approach does not support all reasonable service models for dedicated terminals within this area. Service models may include, for example, circuit switched (CS) type of service (non Internet Protocol based) or packet switched including Internet Protocol. The circuit switched type of services are typically cheaper to implement from a device perspective but less flexible from an application perspective. Packet switched services use Internet Protocol for rich services and for enhancing/providing more flexible applications (for example a videophone, for which RTP is used to synchronize audio/video). Dedicated terminals may be, for example, terminals supporting a single (or limited set of) codecs, for example GSM, AMR, SMV or EVRC codecs. The area may include, audio services including, for example, voice services and/or derivatives such as synchronized audio-video services.

A different solution may be desirable where the network side 110 can support both true Internet Protocol based terminals and simplified or dedicated terminals, without implementing dual protocol stacks and a significant amount of extra functionality on the network side 110. Although separation of audio information traffic (e.g., VoIP) from other traffic is not required, it may simplify the solution and enhance the performance, efficiency and quality of service over the physical layer if the VoIP traffic can be separated from other application traffic (e.g. data traffic such as web browser information). Two possible solutions follow that have simplified terminals and/or networks that have simplified protocol stacks. These solutions may support both terminals with dedicated VoIP applications in the interim and generic VoIP terminals in the future when end-to-end Internet Protocol becomes a reality.

The first solution includes a terminal that may be limited to providing audio interconnection to Internet Protocol based networks with dedicated solutions both for the audio traffic and for the session control functionality. The second solution includes a terminal that has the same dedicated solution for the audio traffic, but still implements a simplified Internet Protocol stack to provide a platform for some simple Internet Protocol applications and could be used to run session control, such as session initiation protocol (SIP), over end-to-end Internet Protocol. Both solutions use the concept of segregating the treatment of the audio information while maintaining an Internet Protocol based protocol stack on the network side 110. The first solution handles the simplest terminals (in the sense that VoIP is implemented in its simplest manner) and in particular may be directed to a wireless terminal including primarily communication of audio information where the audio information is transmitted using Internet Protocol.

The second solution is for support of more enhanced terminals having multiple Internet Protocol based functionality and these terminals will be referred to herein as "hybrids". The "hybrid" nature of this type of VoIP terminal refers to the fact that the call setup may be handled using Internet Protocols (such as SIP, which may imply the presence of an Internet Protocol stack), and in conjunction, a codec may be used as in circuit switched voice systems, e.g., the codec may be directly hooked onto the physical layer. Note that although not discussed in detail herein, both the first and the second solution may include an Internet Protocol stack, independently of the VoIP parts shown in the Figures and described in detail herein, that is used for other type of traffic (e.g., browsing, e-mail, etc). The additional Internet Protocol stack is not shown in the figures because it may or may not be included and the figures are limited to configurations necessary for implementing, for example, VoIP traffic of audio communications using modified conventional wireless terminals.

Figure 3:
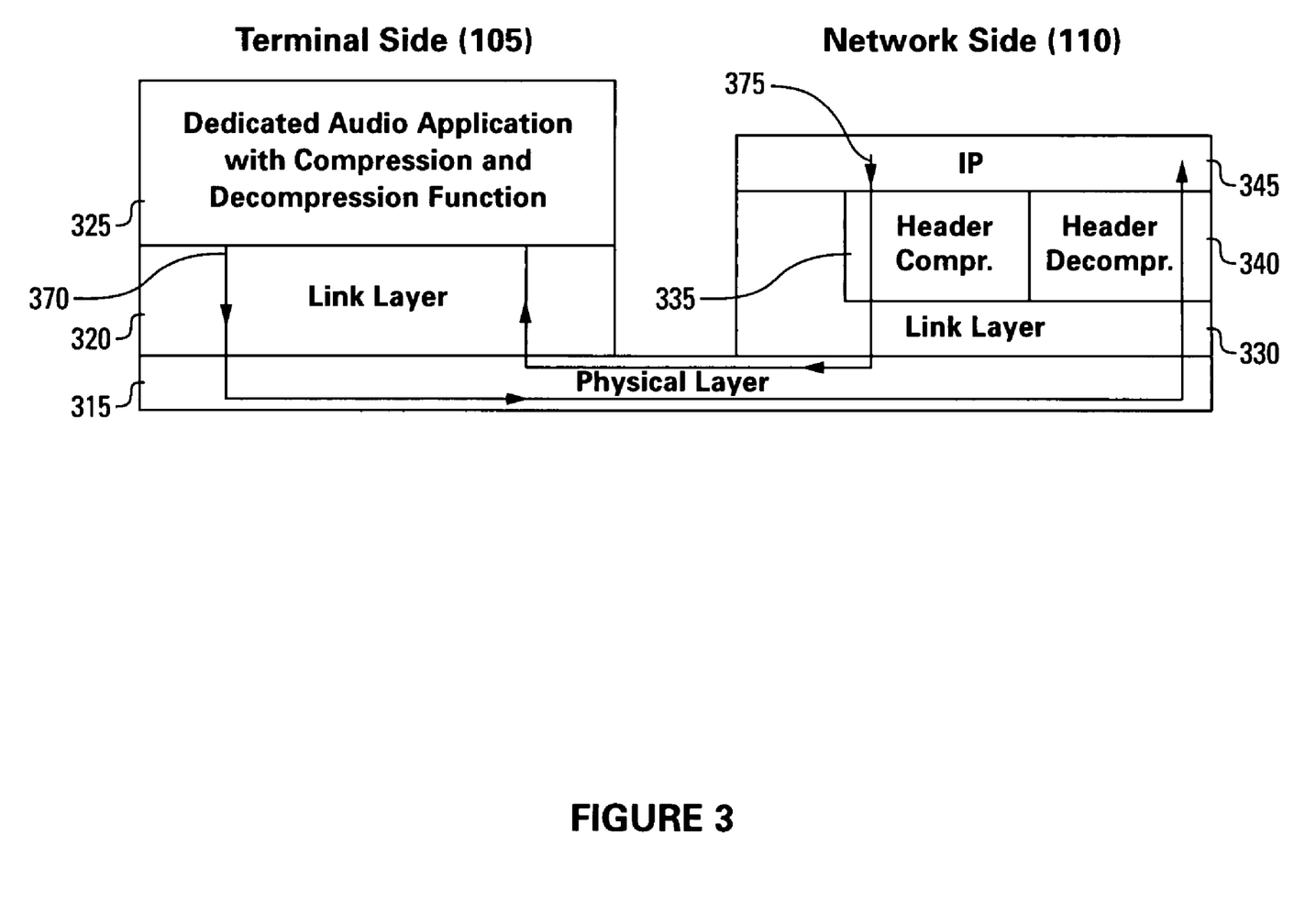
FIG. 3 illustrates an exemplary protocol stack and audio flow for a VoIP setup with a simplified terminal using distinct header compression and decompression modules on the network side and a dedicated audio application with integral compression processing on the terminal side of a communication system.

Referring now to FIG. 3, an exemplary protocol stack and audio flow is illustrated for a VoIP setup with a simplified audio terminal using distinct header compression and decompression protocols on the network side 110 and a dedicated audio application with integrated compression processing on the terminal side 105 of a communication system. In a preferred embodiment, the simplest terminals may be audio-only terminals without any other information communication capabilities such as other Internet Protocol applications (e.g., Internet browsing, e-mail, etc.) that do not require real-time traffic but may require an Internet Protocol stack. However, one skilled in the art will recognize that the dedicated application with integrated header compression and header decompression may be applicable to other applications such as multi-media information communications. Similarly, the terminal may include other dedicated applications, such as wireless application protocol (WAP) services, with or without, integral header compression and header decompression. Herein, the dedicated application approach will be explained using an voice over Internet Protocol (VoIP) example.

FIG. 3 illustrates one possible architecture of the simple audio-only terminal for communication with VoIP peers in an Internet Protocol-based network. The approach taken in this configuration avoids implementing or using a full Internet Protocol stack with complete header compression and header decompression functionality on the terminal side 105, (e.g., wireless terminal). Instead, the terminal side 105 device may have a dedicated audio application 325 that includes all the functionality needed for communicating using Internet Protocol formatted communication information. The terminal side 105 generates compressed headers directly to be put on the audio payloads. In this case, the header compression and header decompression functions are simplified and integrated into, for example, a dedicated audio application and processed by an audio codec. The terminal may be configured to simulate Internet Protocol header compression and Internet Protocol header decompression. As indicated, in this embodiment there is no separate header compression module or header decompression module included in the link layer 320 that is coupled to the dedicated audio application 325 for processing audio communications. As such, the terminal device does not use all the protocols typically found in a general purpose Internet Protocol stack (as seen in FIG. 1). Further, the terminal side 105 includes a physical layer 315 that may include, for example, a radio transceiver and antenna.

In this embodiment, having the header compression (HC) functions for processing audio information included in a codec above the link layer may provide a multitude of advantages as opposed to an implementing the header compression functions in a link layer. For example, the data structures that are kept in memory for compression/decompression context are significantly smaller. Further, not all header compression mechanisms need to be implemented. Furthermore, compressed headers (CH) may at its simplest form be generated by counting up the sequencing once all static information has been transmitted to the other side, because the codec above the link layer has the entire knowledge and control over the headers needed for the dynamic parts of the headers. On the other hand, in the normal case when the header compression functions are included in the link layer, many of the functions related to header compression are needed because the headers to be compressed cannot be predicted or their characteristics are not known in advance. However, when integrating the header compression function in the codec and the codec directly outputs compressed headers with the payload, all this is known and thus many mechanisms are not needed. Also, with the proposed configuration there is no need to have other Internet Protocol stacks to do some processing of the audio communication at the link layer, thus simplifying the processing needs.

With the configuration of the terminal side 105 as illustrated in FIG. 3, the network side 110 may be configured with the general Internet Protocol stack desirable for future end-to-end Internet Protocol. The normal or general Internet Protocol stack for the network side 110 may include an Internet Protocol layer 345 and a link layer 330. The link layer 330 includes a header compression module 335 and header decompression module 340. The network side 110 also includes a physical layer 315.

Figure 4A:
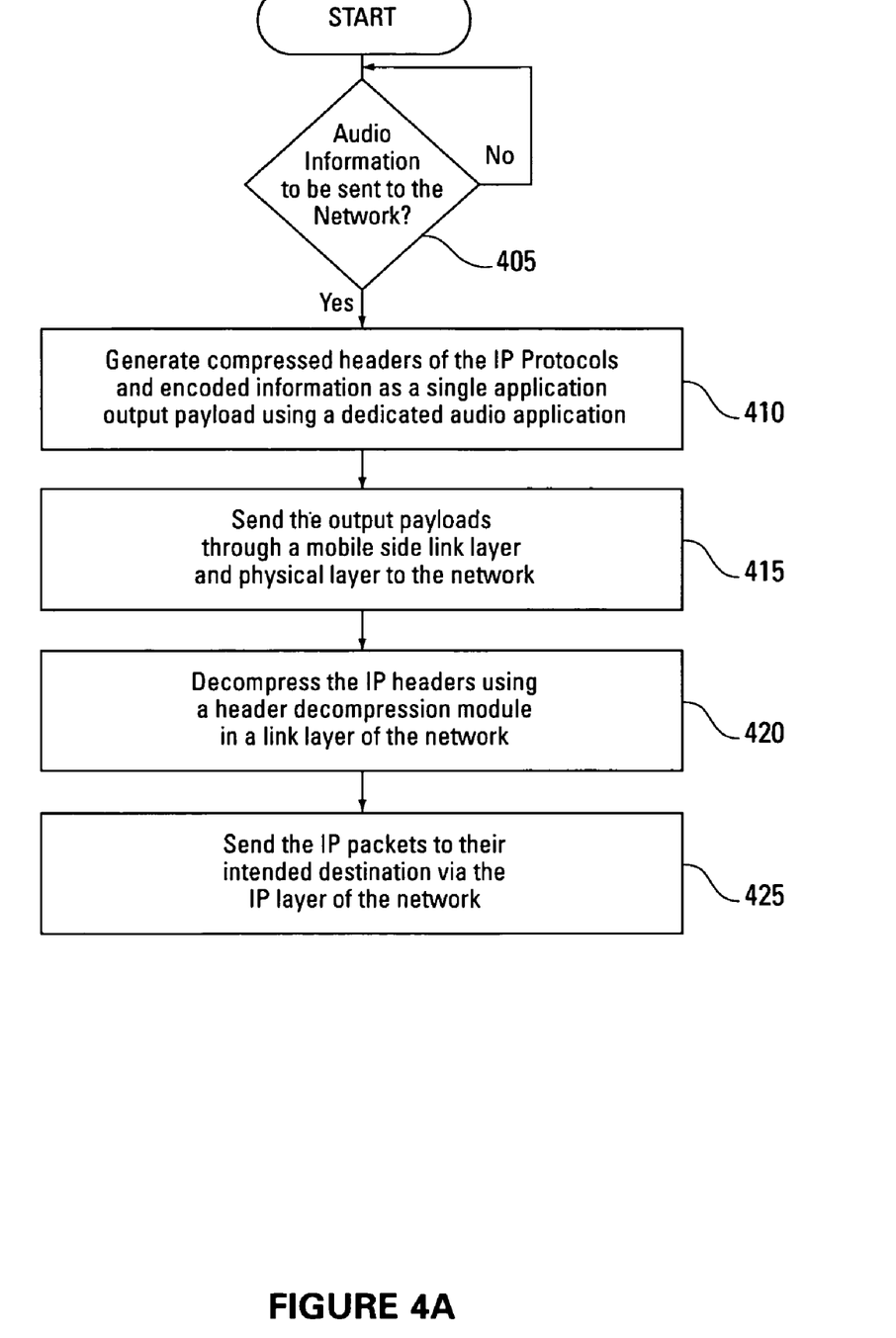
FIG. 4A illustrates an exemplary process flow for sending audio information from the terminal side to the network side using the exemplary protocol stack and audio flow provided in FIG. 3.

Referring now to FIG. 4A, an exemplary process flow will be described for sending audio information from the terminal side to the network side using the exemplary protocol stack and audio flow via signal path 370 of FIG. 3. First, at step 405, the terminal side 105 decides if audio information is to be sent from the terminal to the network side 110. If so, then at step 410 the dedicated audio application 325 digitizes the audio information and generates a compressed header of the Internet Protocol in use (e.g., RTP/UDP/IP for VoIP) together with the encoded audio information as a single application output payload. Next, at step 415, the output payloads including audio information are sent through the link layer 320 and terminal side 105 physical layer 315 (e.g., transceiver and antenna) to the network side 110. The Internet Protocol packets with compressed headers are sent through the network side 110 physical layer 315 to the link layer 330 and the header decompression module 340. Then, at step 420, the header decompression module 340 decompresses the headers of the Internet Protocol packets according to the particular header compression scheme used by the terminal side 105 to compress the header. Then, at step 425, the network side, for example a base station or base station controller, sends the decompressed Internet Protocol packets to their intended destination via the Internet Protocol layer 345.

Figure 4B:
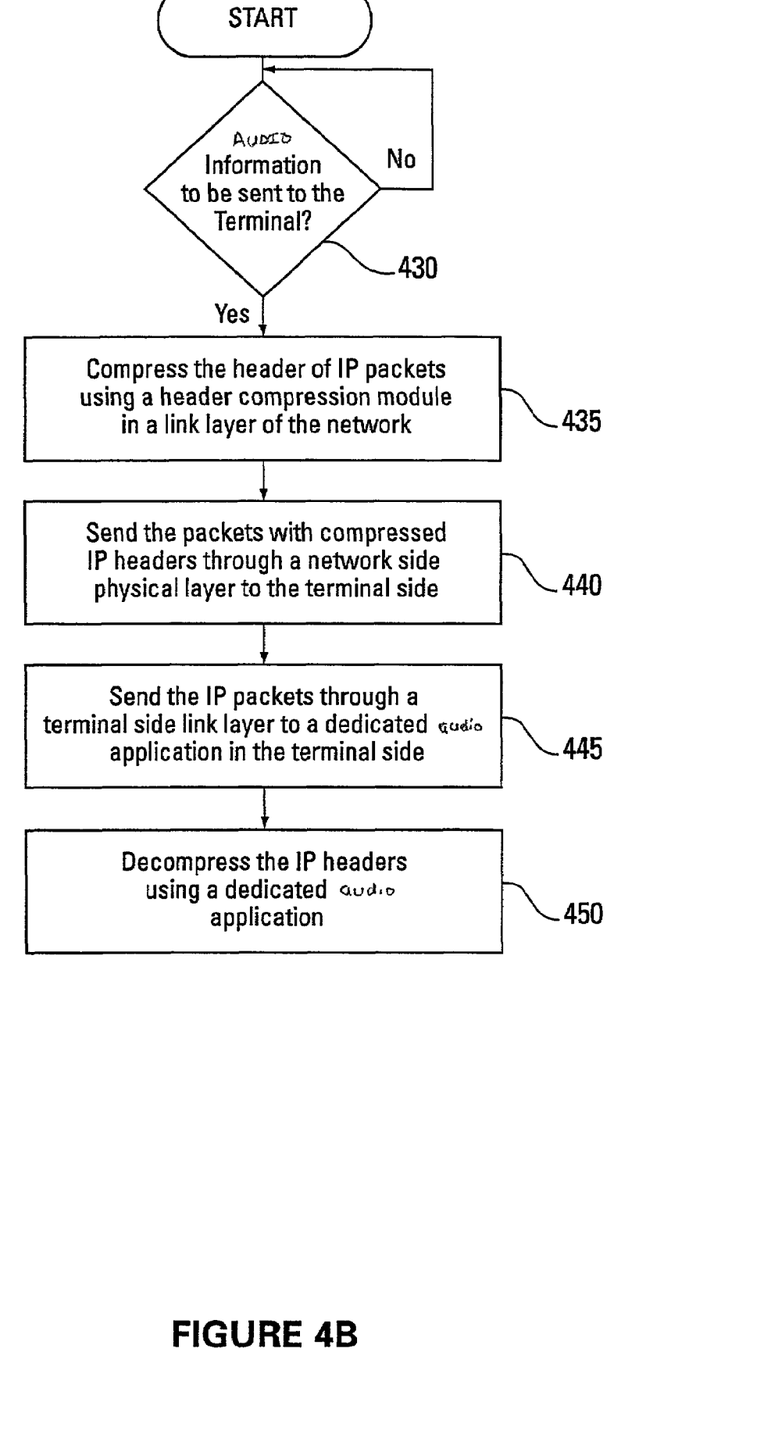
FIG. 4B illustrates an exemplary process flow for sending audio information from the network side to the terminal side using the exemplary protocol stack and audio flow provided in FIG. 3.

Referring now to FIG. 4B, an exemplary process flow will be explained for sending audio information from the network side 110 to the terminal side 105 using the exemplary protocol stack and audio flow via signal path 375 as provided in FIG. 3. First, at step 430, the network side 110 decides if audio information is to be sent from the network to the terminal side 105. If so, then at step 435 the header compression module 335 in the link layer 330 of the network side 110 compresses the header of Internet Protocol packets to be sent on signal route 375 to the terminal side 105. Next, at step 440, the Internet Protocol packets with compressed headers are sent through a network side physical layer 315, e.g., a base station transceiver and antenna, to the terminal side 105. Then, at step 445, the packets with compressed Internet Protocol headers are sent through the link layer 320 to the dedicated audio application 325 without first being decompressed. Next, at step 450 the decompression function of the dedicated audio application 325 decompresses the Internet Protocol headers. The dedicated audio application 325 may also convert the stream of decompressed Internet Protocol packets from digital audio information to an analog signal for generation audio according to the sent audio information.

As configured in FIG. 3, the terminal side 105 communication device would look to the network and user as a true Internet Protocol terminal having a full Internet Protocol stack and operation, as long as only the application it is supporting is used. For example, a GSM, EVRC, SMV or AMR specific codec may be used, and the codec may be modified to output compressed headers directly on the audio payload as a VoIP codec in a simple terminal, while the terminal implementation for audio is employed as in current second generation terminals with minor modifications to support the dedicated application. If any application, other than the specific GSM, EVRC, SMV or AMR used in the codec, would try to communicate with the wireless terminal, this would of course fail since the dedicated application only supports audio communications. However, the communication device may be configured with multiple applications each having their own header compression and header decompression functionality where needed. It should be noted that the simplified terminal approach may include one or more of any header compression scheme such as, e.g., Van Jacobson's "Compressing TCP/IP Headers for Low-Speed Serial Links" scheme (herein referred to as the VJ compression scheme), Mikael Degermark et al.'s "IP Header Compression" scheme (herein referred to as the IPHC compression scheme), Steven Casner et al.'s "Compressing IP/UDP/RTP Headers for Low-Speed Serial Links" scheme (herein referred to as the CRTP compression scheme), Carsten Borman et al. "Robust Header Compression (ROHC)" scheme (herein referred to as the ROHC compression scheme); and Lars-Erik Jonsson et al.'s "A Link-Layer Assisted ROHC Profile for IP/UDP/RTP" scheme (herein referred to as the LLA compression scheme); and other 0-byte header compression schemes.

Figure 5:
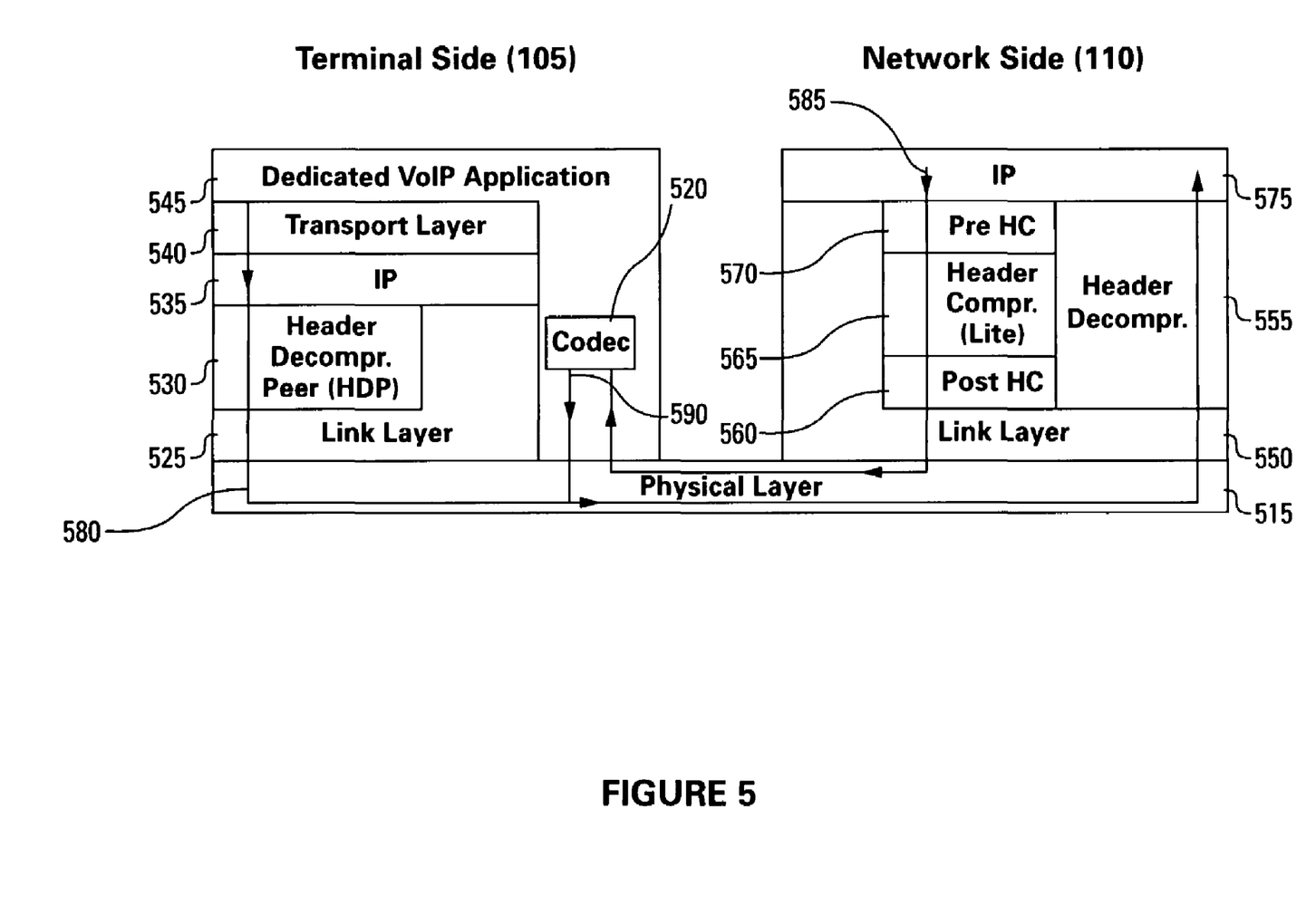
FIG. 5 illustrates an exemplary protocol stack and audio flow for a hybrid VoIP setup using modified header compression protocols on the network side and a dedicated audio application and header decompression peer on the terminal side of a communication system.

Referring now to FIG. 5, an exemplary protocol stack and audio flow are provided for a more robust terminal, herein referred to as a "hybrid" terminal approach. The hybrid terminal approach may integrate the use of Internet Protocol functionality for call setup (e.g., using Internet Protocol such as SIP) and may provide Internet Protocol header decompression initialization via the header decompression peer, while using a circuit-switched architecture in the terminal side 105 for the audio codec as in a second generation wireless terminal to achieve a VoIP-capable terminal. One aspect of the invention is to preferably reuse the existing header compression protocols while adding some components to make the header compression on the network side 110 behave as a header remover in the reverse direction (network side 110 to terminal side 105). Further, the header compression will act as a header generator in the forward direction (terminal side 105 to network side 110). Accordingly, with minimal additions on the network side 110, the network can support true end-to-end Internet Protocol capable devices on the terminal side 105 with true header compression in both direction using the same header compression implementation, as well as supporting non-Internet Protocol interim implementations of audio capable terminals.

The hybrid approach may include modifying the header compression configuration on the network side 110 and including a dedicated audio application and header decompression peer on the terminal side 105 of a communication system. In one variation, the hybrid approach may include some simple additions to modify the behavior of otherwise unchanged existing header compression protocols. Alternatively, some of the necessary functionality may be achieved using a different but even simpler implementation independent of the header compression implementation.

In one embodiment, the configuration processes the audio information flow in a segregated manner without going through an Internet Protocol stack in the terminal. To achieve this, a number of modifications are made to the general Internet Protocol stacks so that the audio information can traverse between the terminal side 105 and the network side 110 as digitized information without Internet Protocol packet headers. On the terminal side 105 there is no header compression module or header decompression module. Rather, the audio information is sent directly to and from an audio codec as digitized information and may be in packet form with a minimal size Internet Protocol header or no Internet Protocol header at all. Further, the terminal side 105 includes a header decompression peer (HDP) 530 that is used to initiate header generation by the header decompression module 555 on the network side 110 for audio information received from the terminal side 105. On the network side 110, the header compression module 565 is complemented with other header modification functions that allow the Internet Protocol audio packets to be stripped of their Internet Protocol headers and the audio information found in the Internet Protocol packet payloads to be correctly time sequenced. These functions may be incorporated in the header compression module 565 or in one or more of a separate pre-header compression module 570 (pre-HC) and post header compression module 560 (post-HC).

More specifically, the communication system according to this approach includes a dedicated VoIP Application 545 with an audio codec 520. The audio codec 520 may be a typical audio codec used in, for example, a wireless terminal. The audio codec 520 may encode and decode digitized audio information using, for example, GSM, SMV, AMR, EVRC, etc., type encoding. The audio codec 520 may be directly connected to a physical layer 580 (e.g., a transceiver and antenna) on the terminal side 105 or via a link layer which is transparent (that has no effect) from a user traffic perspective. For this reason, typical Internet Protocol header compression and decompression modules are not needed on the terminal side 105 as will be explained in more detail below. In any case, further on the terminal side 105 the dedicated VoIP application 545 is coupled to a transport layer 540 and the transport layer is coupled to an Internet Protocol layer 535. The Internet Protocol layer 535 is coupled to the link layer 525 that may include a header decompressor peer 530 (discussed in more detail below). The link layer 525 is coupled to the physical layer 525.

The network side 110 may include a physical layer 515 (e.g., a transceiver and antenna) coupled to a link layer 550. The link layer 550 may include a header decompression module 555 and a header compression module 565. Further, in one embodiment the link layer 550 may include a pre-HC 570 and/or a post-HC 560 to modify audio information received in Internet Protocol packets so as to be compatible with codec 520. In addition, the network side 110 may include an Internet Protocol layer 575 coupled to the link layer 550.

As illustrated in FIG. 5, the hybrid terminal (terminal side 105) may have an Internet Protocol stack (e.g., Internet Protocol layer 535) that in one embodiment may be simplified with a less generic interface to higher layers and minimal functionality. In this case, audio session control signaling could be handled over Internet Protocol end-to-end. The header decompression peer 530 may be included with the Internet Protocol stack and function to deceive the network side header decompression module 555 to generate headers for digitized audio data sent by the codec 520. The network side 110 pre-HC module 570 and post-HC module 560 may enable the header compression module 565 to act as a header terminator.

With the audio codec 520 directly connected to the physical layer 515 in the terminal side 105, no audio traffic passes through an Internet Protocol stack. Thus, header compression is not needed in the wireless terminal for processing the real time audio traffic to and from the dedicated VoIP application 545. Although, header compression and header decompression modules may be included to handle other Internet Protocol applications. However, there must be some entity on the terminal side 105 that establishes a header compression relation with the decompression module 555 on the network side 110 so that the header decompression module 555 may work as if it were decompressing compressed packets. As such, the header decompression peer 530 controls the header decompression module 555 to operate as a header generator for Internet Protocol packets containing audio information sent by the codec 520 on the terminal side 105. The header decompression peer 530 may be actuated by the dedicated VoIP application 545 at the beginning of an audio session. For example, the header decompression peer 530 initialization may be triggered by the call control functionality of the dedicated VoIP application, either over an external interface or by a certain packet sent through the Internet Protocol stack and through the header decompression peer 530. The Internet Protocol stack may be configured to ensure that all VoIP call setup packets passes through it. In general, the header decompression peer 530 functions to deceive the header decompression module 555 on the network side 110 to operate as though it is decompressing packets from a corresponding header compressor on the terminal side 105, by sending header compression initialization packets to the header decompression module 555. This then establishes a compression context for header generation of subsequent no header audio information packets sent by the codec 520. Once the compression context is set, the header decompression peer 530 need not be part of the communication session anymore because all the audio packets are then sent directly from the codec 520 to the physical layer 515. The header decompression module 555 will then do all the work creating headers without even being aware of the deception provided by the header decompression peer 530. The header decompression module 555 generates a valid RTP/UDP/IP header based on the decompression context and packetizes the received digitized audio payload by pre-pending this Internet Protocol header to create an Internet Protocol packet.

The hybrid approach also needs various modifications, that may be in the form of simple additions, on the network side 110 to support the audio information to be sent from the network side 110 to the terminal side 105. In particular, the audio information will arrive at the Internet Protocol layer 575 in Internet Protocol packet format and will need to be modified to arrive at the audio codec 520 as a stream of audio information encapsulated in a communication packet using, for example, one or more of a number of standard transmission encodings used for such systems as GSM, PDC, CDMA or WCDMA. For example, the Internet Protocol packeted audio information may need to be buffered sequentially in a correct time sequence, have the headers removed and any empty time slots filled. These processes could be implemented in a number of ways. FIG. 5 provides one preferred way in which some of the additional functionality needed could either be inserted in the pre-HC module 570 or in the post-HC module 560. On the other hand, the needed functions might be included in only the pre-HC module 570 or in the header compression module 565 itself.

Prior to the header compression module 565, the incoming packet headers should be modified to avoid undesirable irregularities in the header information that would otherwise force the header compression module 565 to generate larger compressed headers, or in case of 0-byte header compression, not to be able to generate no-header packets. This function may be similar to the Node Violation (Node V) that has previously been applied in other situations to the Internet Protocol Identification (ID) field to eliminate significant undesirable variations in that header field. Thus, in this case Node V may be extended with functionality to avoid all undesirable irregularities in the complete header information field of incoming VoIP packets.

If the majority of the needed processing modifications are desirable prior to the header compression module 565, then in one embodiment the post-HC module 570 may further include a packet buffer (to get packets in order), empty slot filler and possibly time synchronization (as part of buffering). The audio information output from the post-HC 570 would then be a completely regular packet stream entering the header compression module 565 and the output from the header compression module 565 would be packets with fixed, minimal-sized compressed headers. In the case of 0-byte header compression by the header compression module 565, the output would then be no-header packets.

As noted earlier, some of the VoIP packet modification functionality could be applied either prior to, or after, the header compression occurs. For example, in the embodiment illustrated in FIG. 5, a post-HC module 560 may be included. Accordingly, the output from the post-HC module 560 may be a completely ordered and regular packet stream with no-header packets even though the output from the header compression module 565 are not. As such, the post-HC module 560 may correctly time-order the packets, fill empty time slots, and completely time synchronize the audio information packets. Further, all initialization headers and possible feedback messages may be removed by the post-HC module 560 since they may not be useful at the terminal side 105 anyway. Since, packet synchronization and reordering is likely easier to do prior to header compression so it may be preferable to do those operations in the pre-HC module 570. However, the post-HC module 560 should still do the final operations and strip the headers from the VoIP packets to produce a regular packet stream with header-free packets.

In another embodiment the header compressor may be modified to include all the functions of the pre-HC module 570 and post-HC module 560. In an even further embodiment, it is possible to completely remove the general header compression module 565 and replace it with one or more modules that operate as a VoIP packet synchronizer, reorder, slot filler and stripper. This approach would, to some extent, reduce the overall implementation complexity for the hybrid case. However, from a generic VoIP approach point of view, preparation for future end-to-end VoIP implementation, and support of other Internet Protocol applications, it is better to reuse the header compression module 565 and add the limited amount of functionality for modifying the VoIP packets to support the hybrid terminal.

Comparing the hybrid approach to the gateway-based solution shown in FIG. 2, the hybrid approach requires less modifications. Only some minor additions are made to the generic VoIP network side 110 illustrated in FIG. 1. Further, when comparing the hybrid approach with the simple approach shown in FIG. 3 (which leaves the network side 110 completely unaffected), the hybrid approach requires some additions to the generic VoIP model (FIG. 1) for the network side 110 entities so as to ensure that the size of the compressed headers carried to the terminal side 105 is of minimal size, specifically for the case of a 0-byte header compressor. One particularly suitable header compression scheme may be the LLA. As a result, only the audio information be conveyed in a manner that is suitable for the receiver (ordering, time synch, etc.). However, these additions are justified by a number of advantages such as maintaining the header compression components required in an all-Internet Protocol architecture for providing connectivity to true Internet Protocol terminals unchanged while using only minor additions to the network side, simplified terminal implementations (e.g., no real header compression and decompression functions in the Internet Protocol stack for real-time streams, (e.g., audio streams, audio-video, etc.)), the possibility to use session control over Internet Protocol end-to-end and (with certain limitations), the possibility to use an open interface for other simple Internet Protocol applications (e.g., email, web browser, etc) to be run on the terminal. Once again, it should be noted that the system and method are not limited to any particular header compression scheme and various compression schemes may be used including, for example, VJ, IPHC, CRTP, and ROHC. However, the 0-byte header compression schemes such as LLA is particularly beneficial when used in with the present invention.

Figure 6A:
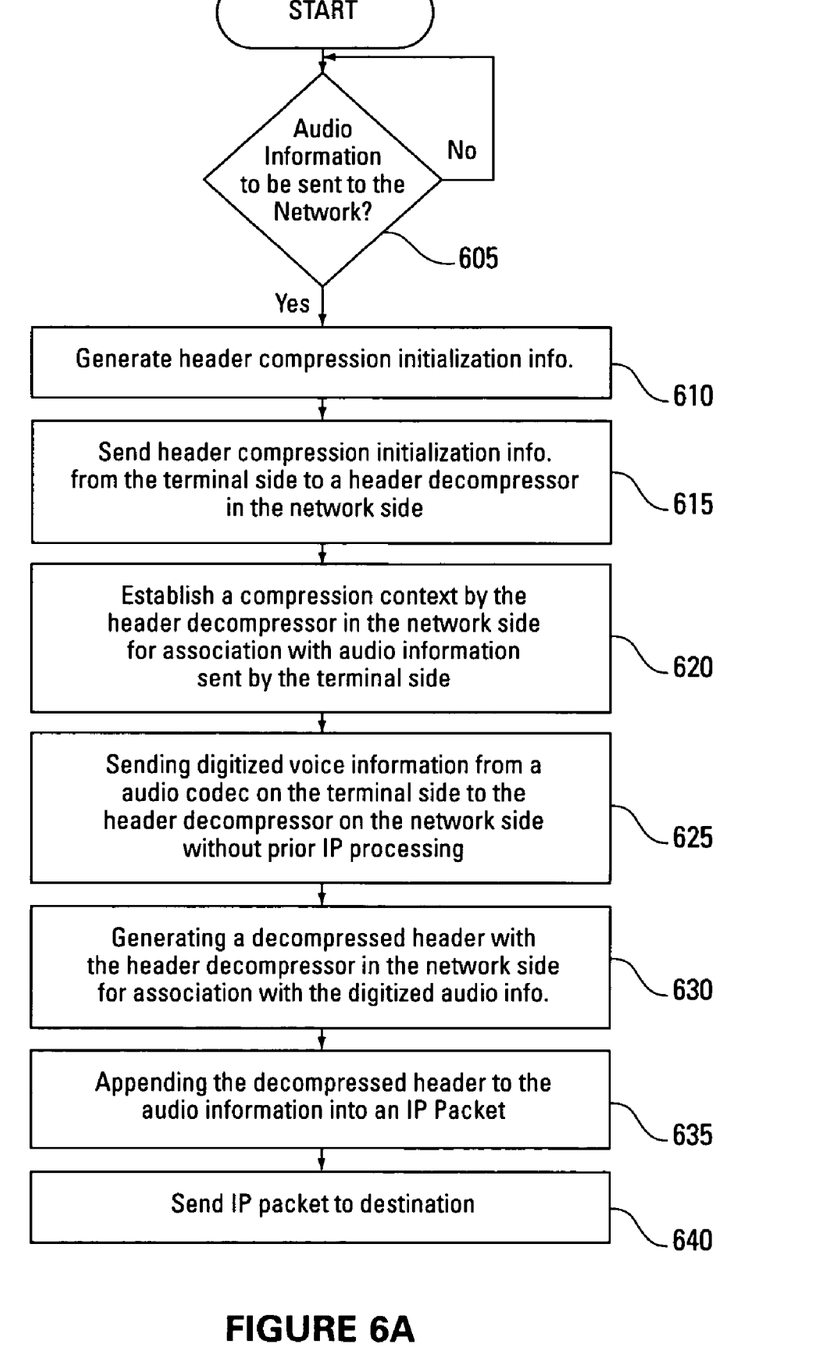
FIG. 6A illustrates an exemplary process flow for sending audio information from the terminal side to the network side using the exemplary protocol stack and audio flow provided in FIG. 5.

Referring now to FIG. 6A, an exemplary audio information process flow is illustrated for sending audio information from the terminal side 105 to the network side 110 using the exemplary protocol stack and audio flow for the hybrid approach provided in FIG. 5. If audio information is to be sent to the network side 110, as indicated in step 605, then the header decompression peer 530 will generate header compression initialization information as indicated in step 610. The header compression initialization information relates to, for example, any static fields found in the Internet Protocol headers, the initial values of dynamic fields of Internet Protocol headers as well as which functions will be use to decompress the dynamic fields. Next, at step 615, the header compression initialization information is sent from the terminal side 105 via signal path 580 to the header decompression module 555 at the network side 110. Then, at step 620, the header decompression module 555 establishes a header decompression context to be associated with audio information subsequently received from the terminal side 105. The header decompression context includes information relating to, for example, all static fields found in the Internet Protocol headers, the latest values of dynamic fields of Internet Protocol headers as well as which functions are in use to decompress the dynamic fields.

At step 625, the codec 520 on the terminal side 105 begins sending digitized audio information to the header decompression module 555 at the network side 110 via signal path 580, without any Internet Protocol processing. The digitized audio information may be sent from the codec 520 in any audio encoding format, such as any of EVRC, GSM, SMV, AMR, etc. Then at step 630, the header decompression module 555 generates headers, that appear as though they are decompressed headers, for association with various audio information to be inserted into an Internet Protocol packet payload. The Internet Protocol header when using RTP/UDP/IP (VoIP) protocols may contain, for example, an Internet Protocol source address (static), an Internet Protocol destination address (static), a UDP source port (static), a UDP destination port (static), an RTP sequence number (dynamic), and an RTP Timestamps (dynamic).

Next, at step 635, header information generated by the header decompression module 555 is appended to audio information received from the codec 520 into a stream of Internet Protocol packets, e.g., a VoIP packet. The Internet Protocol packets are "recovered" in the link layer 550 via the header decompression module 555. Then, at step 640 the Internet Protocol layer 575 sends the Internet Protocol packets over the network to an intended destination, such as a telephone or a PC located in a different location. For example, the VoIP packets may be sent across the Internet or an intranet to another wireless terminal base station where it is transmitted to another wireless terminal using the Internet Protocol header to send forward the packet based on the information found in the Internet Protocol header (such as Internet Protocol destination address). In any case, the terminal side 105 communication device (e.g., a wireless terminal) segregates the audio traffic via the codec 520 and the header decompression peer 530 controls the header decompression module 555 via signal 580 to accept the audio information traffic via signal 590 from the codec 520 and create appropriate Internet Protocol headers for the audio information traffic.

Figure 6B:
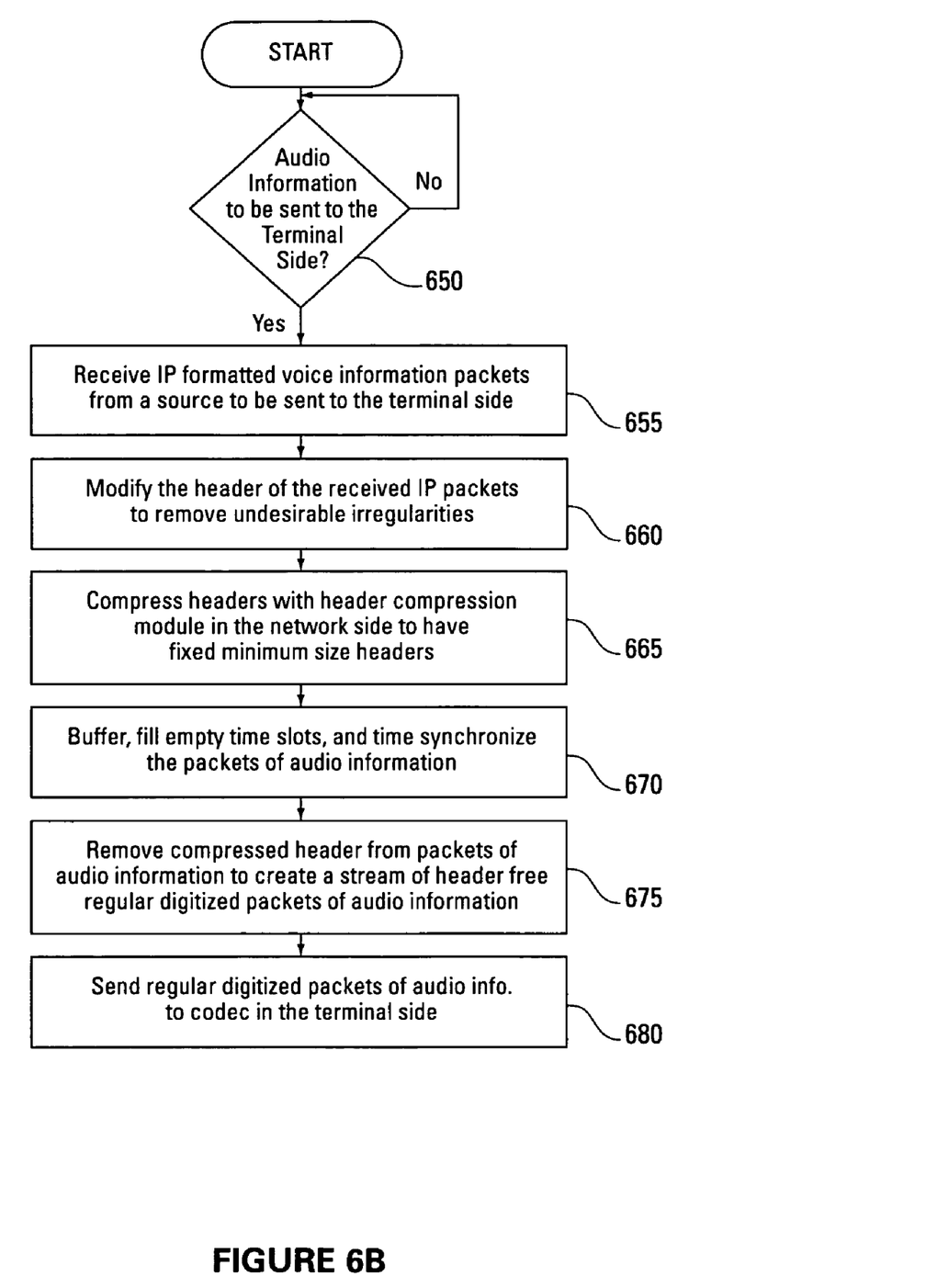
FIG. 6B illustrates an exemplary process flow for sending audio information from the network side to the terminal side using the exemplary protocol stack and audio flow provided in FIG. 5.

Referring now to FIG. 6B, an exemplary process flow for sending audio information from the network side 110 to the terminal side 105 using the exemplary protocol stack and audio flow provided in FIG. 5 will now be described. If there is audio information to be sent from the network side 110 to the terminal side 105 at step 650, then at step 655 the Internet Protocol layer 575 receives the Internet Protocol formatted audio information (e.g., VoIP) from a source and may forward it to the pre-HC module 570 if present. Next, at step 660 the network side 110, for example pre-HC module 570, modifies the header of the received VoIP packets to remove any undesirable irregularities so that the header decompression module 565 does not create a larger header using, for example, a method similar to NODE V. Then, at step 665, the header compression module 565 compresses the headers of the VoIP packets so as to have a fixed minimum size. Next, at step 670, the post-HC module 560 may buffer, fill empty time slots, and time synchronize the packets of audio information. Of course, as mentioned before, these operations may be performed by the post-HC module 560 and/or the header compression module 565. Then, at step 675, the network side 110, for example the post-HC module 560, may remove the compressed header from the packets of audio information to create a stream of header free digitized packets of audio information. Next, at step 680, the digitized packets of audio information are sent via signal path 585, (the audio information in the packets being coded in accordance with, for example GSM, SMV, AMR, EVRC, etc.), across the physical layers 515 (e.g., transceivers and antennas) to the codec 520 on the terminal side. As such, the network side is modified to convert the VoIP header information to a non-Internet Protocol format header information compatible with a typical codec, such as, GSM, SMV, EVRC, AMR, etc The exemplary embodiments for the simplified terminal approach in FIG. 3 and the hybrid terminal approach in FIG. 5 may both support other Internet Protocol based applications and incorporate the functions required for supporting generic VoIP capable terminals and a smooth transition to end-to-end VoIP communication system. As indicated, the network side 110 protocol stack includes a header decompression module, a header compression module, and an Internet Protocol layer and may thus support the operation of wireless terminals having a true generic VoIP protocol stack as shown in FIG. 1. In the case of the hybrid approach, the functions that are not typically associated with end-to-end Internet Protocol (e.g., modifying the Internet Protocol packet headers) may be activated only upon association with a hybrid style terminal side 110 by using, for example, a specific option in the type of service provided by the network or a terminal identification process that may occur, for example, during a handshaking process between the network side 110 and the terminal side 105. In this way, the pre-HC 570 and post-HC module 560 may be inoperable for a true generic VoIP terminal, while header compression module 565 may be operable for both a hybrid type terminal and a true generic VoIP terminal. As the newer true generic terminals become more available in the future, the network side 110 will not need to be upgraded to include hardware and software as would be needed for the gateway approach shown in FIG. 2.

As noted above, the present invention may use any one or a plurality of header compression schemes. For more detail on some header compression schemes please see: (1.) Van Jacobson, *Compressing TCP/IP Headers for Low-Speed Serial Links*. IETF RFC 1144, IETF Network Working Group, February 1990 [VJ]; (2.) Mikael Degermark, Björn Nordgren, Stephen Pink, *IP Header Compression*. IETF RFC 2507, IETF Network Working Group, February 1999 [IPHC]; (3.) Steven Casner, Van Jacobson, *Compressing IP/UDP/RTP Headers for Low-Speed Serial Links*. IETF RFC 2508, IETF Network Working Group, February 1999 [CRTP]; (4.) Carsten Bormann, et. al. *Robust Header Compression (ROHC)*. IETF RFC 3095, April 2001 [ROHC]; (5.) Lars-Erik Jonsson, Ghyslain Pelletier. *A Link-Layer Assisted ROHC Profile for IP/UDP/RTP.* Internet Draft (now RFC 3242 of the ROHC workgroup), February 2001 [LLA]; and (6.) Jonsson et al., "Manipulation of Datagram Header Fields for Performance Improvements", U.S. patent application Ser. No. 09/406,950, filed Sep. 28, 1999 [NODE V], which are hereby incorporated by reference for all purposes.

Although particular embodiments of the present invention have been shown and described, it will be understood that it is not intended to limit the invention to the preferred embodiments and it will be obvious to those skilled in the art that various changes and modifications may be made without departing from the spirit and scope of the present invention. Thus, the invention is intended to cover alternatives, modifications, and equivalents, which may be included within the spirit and scope of the invention as defined by the claims.

For example, the present invention is described in terms of a traditional radio communication wireless interface between the terminal side 105 and the network side 110. However, the interface may include wired networks such as a LAN or WAN, or one of many wireless type communications systems such as a infrared, wireless LAN, an ad-hoc network such as Bluetooth, etc., and is applicable where end-to-end Internet Protocol is desired. These approaches are particularly applicable when end-to-end VoIP and the bandwidth of at least one hop is less then desired.

Further, the protocol stacks for the terminal side 105 and the network side 110 may be switched for various applications. For example, if one wished to provide a means for interfacing with a true generic VoIP configured terminal via a circuit switched network without including a complete Internet Protocol stack on the network side, the terminal side 105 protocol stack could be used on the network side 110 and the network side 110 protocol stack could be used on the terminal side 105.

All publications, patents, and patent applications cited herein are hereby incorporated by reference in their entirety for all purposes.

The invention claimed is:

1. A method for communicating audio information between a wireless terminal and a network, wherein the network operates at least in part in accordance with Internet Protocols (IP), the method comprising the steps of:
   transferring, in the wireless terminal, header-free audio information packets directly between a coder/decoder (codec) and a physical layer, wherein the header-free audio information packets do not pass through an Internet Protocol layer; and
   transmitting and receiving the header-free audio information packets between the physical layer in the wireless terminal and a physical layer in the network.

2. The method of claim 1, further comprising the steps of:
   generating, in the wireless terminal, header compression initialization information:
   transmitting the initialization information to the network; and
   establishing, by a decompressor in the network, a compression context for header generation for the header-free audio information packets.

3. The method of claim 2, further comprising the steps of:
   receiving, by the decompressor, the header-free audio information packets from the physical layer in the network;
   generating, by the decompressor, a decompressed header for the header-free audio information packets;
   appending the header-free audio information packets to the decompressed headers; and
   forwarding the combined decompressed headers and header-free audio information packets to a destination.

4. The method of claim 1, further comprising the steps of:
   receiving, by the network, packets from a source intended for the wireless terminal, wherein each of the packets includes a header;
   modifying the header to remove irregularities;
   buffering and time synchronizing the received packets, wherein the buffering and time synchronization includes filling empty time slots;
   performing header compression on the buffered and time synchronized packets to produce header free packets; and
   transmitting header free packets to the wireless terminal.

5. The method of claim 4, further comprising the step of:
   removing initialization headers and feedback messages from the packets prior to transmission of the packets to the wireless terminal.

6. The method of claim 1, further comprising the steps of:
   receiving, by the network, packets from a source intended for the wireless terminal, wherein each of the packets includes a header;
   modifying the header to remove irregularities;
   performing header compression on the packets with the modified header to produce header free packets;
   buffering and time synchronizing the header free packets, wherein the buffering and time synchronization includes filling empty time slots; and
   transmitting the buffered and time synchronized header free packets to the wireless terminal.

7. The method of claim 6, further comprising the step of:
   removing initialization headers and feedback messages from the packets prior to transmission of the packets to the wireless terminal.

8. The method of claim 1, further comprising the steps of:
   receiving, by the network, packets from a source intended for the wireless terminal, wherein each of the packets includes a header;
   buffering and time synchronizing the received packets, wherein the buffering and time synchronization includes filling empty time slots;
   removing the header of the buffered and time synchronized packets; and
   transmitting the header removed packets to the wireless terminal.

9. A method for communicating audio information between a wireless terminal and a network, wherein the network operates at least in part in accordance with Internet Protocol (IP), the method comprising the steps of:
   generating, in the wireless terminal, header compression initialization information;
   transmitting the initialization information to the network;
   establishing, by a decompressor in the network, a compression context for header generation for audio information packets having no headers;

transferring, in the wireless terminal, header-free audio information packets directly from a codec to a physical layer, wherein the header-free audio information packets do not pass through an Internet Protocol layer;

transmitting the coded header-free audio information packets from the physical layer in the wireless terminal to a physical layer in the network;

receiving, by the decompressor, the header-free audio information packets from the physical layer in the network;

generating, by the decompressor, decompressed headers;

appending the header-free audio information packets to the decompressed headers; and forwarding the combined decompressed headers and header-free audio information packets to a destination.

10. A method for communicating audio information between a wireless terminal and a network, wherein the network operates at least in part in accordance with Internet Protocols (IP), the method comprising the steps of:

receiving, by the network, packets intended for the wireless terminal, wherein each of the packets includes a header;

modifying the header to remove irregularities;

buffering and time synchronizing the header modified received packets, wherein the buffering and time synchronization includes filling empty time slots;

performing header compression on the buffered and time synchronized packets to produce header free packets;

removing initialization headers and feedback messages from the packets prior to transmission of the packets to the wireless terminal;

transmitting the header free packets to the wireless terminal; and transferring, in the wireless terminal, audio information directly from a physical layer to a coder/decoder (codec), wherein the audio information does not pass through an Internet Protocol layer.

11. A method for communicating audio information between a wireless terminal and a network, wherein the network operates at least in part in accordance with Internet Protocols (IP), the method comprising the steps of:

receiving, by the network, audio information packets intended for the wireless terminal, wherein each of the audio information packets includes a header;

modifying the header to remove irregularities;

performing header compression on the audio information packets with the modified header to produce header free packets:

buffering and time synchronizing the header free packets, wherein the buffering and time synchronization includes filling empty time slots;

removing initialization headers and feedback messages from the header free packets prior to transmission of the packets to the wireless terminal;

transmitting the buffered and time synchronized header free packets to the wireless terminal via a physical layer in the network to a physical layer in the wireless terminal; and transferring, in the wireless terminal, the header free packets directly from the physical layer to a coder/decoder (codec), wherein the the header free packets do not pass through an Internet Protocol layer.

12. An apparatus, comprising:

a first communication device having a protocol stack including an Internet Protocol header compression module, the Internet Protocol header compression module being augmented or modified so as to operate as a header and Internet Protocol terminator, wherein the modification of the Internet Protocol header compression module includes one or more functions selected from the group consisting of:

modifying a header to eliminate irregularities in data in the header that may cause the Internet Protocol header compressor to generate larger than desired compressed headers, buffering Internet Protocol packets, filling empty slots in the Internet Protocol packets, time synchronizing of the Internet Protocol packets, and stripping the Internet Protocol packet payloads of the Internet Protocol header.

13. The apparatus of claim 12, wherein the Internet Protocol header compression module terminates the Internet Protocol header and Internet Protocol format when the first communication device is communicating with a communication device that uses a protocol other than Internet Protocol, and the Internet Protocol header compression module compresses an Internet Protocol header when the first communication device is communicating with a communication device that uses Internet Protocol.

14. The apparatus of claim 12, wherein the first communication device includes a pre header compression module (pre-HC) that performs one or more of the modified functions of the Internet Protocol header compression module.

15. The apparatus of claim 14, wherein the first communication device includes a post header compression module (post-HC) that performs one or more of the modified functions of the Internet Protocol header compression module.

16. The apparatus of claim 15, wherein the first communication device includes an Internet Protocol header decompression module.

17. The apparatus of claim 12, wherein information contained in the Internet Protocol packets payload may be at least in part selected from the group consisting of: audio information, video information, and multi-media information.

18. The apparatus of claim 17, wherein the first communication device is a base station or a base station controller and the second communication device is a wireless terminal.

19. The apparatus of claim 18, wherein the first communication device and the second communication device share information session control signaling using Internet Protocol formatted signals.

* * * * *